(12) United States Patent
Byun et al.

(10) Patent No.: US 10,601,021 B2
(45) Date of Patent: Mar. 24, 2020

(54) BATTERY MODULE

(71) Applicant: Samsung SDI Co., Ltd., Yongin-si, Gyeonggi-do (KR)

(72) Inventors: Sang-Won Byun, Yongin-si (KR); Jeong-Won Oh, Yongin-si (KR); Jong-Woo Nam, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 201 days.

(21) Appl. No.: 15/170,643

(22) Filed: Jun. 1, 2016

(65) Prior Publication Data

US 2016/0359160 A1 Dec. 8, 2016

(30) Foreign Application Priority Data

Jun. 3, 2015 (KR) .................. 10-2015-0078604

(51) Int. Cl.
*H01M 2/34* (2006.01)
*H01M 10/42* (2006.01)
(Continued)

(52) U.S. Cl.
CPC ......... *H01M 2/345* (2013.01); *H01M 2/1016* (2013.01); *H01M 2/1235* (2013.01);
(Continued)

(58) Field of Classification Search
CPC .... H01M 2/202; H01M 2/345; H01M 2/1016; H01M 10/425; H01M 2/34;
(Continued)

(56) References Cited

U.S. PATENT DOCUMENTS 8,104,404 B2 1/2012 Maeda et al.
2005/0083164 A1\* 4/2005 Caruso ................ H01H 39/006
337/157
(Continued)

FOREIGN PATENT DOCUMENTS

EP 2811549 A1 \* 12/2014
JP 2008-138949 A 6/2008
KR 10-2013-0118539 A 10/2013

*Primary Examiner* — Milton I Cano
*Assistant Examiner* — Philip A. Stuckey
(74) *Attorney, Agent, or Firm* — Knobbe Martens Olson & Bear LLP

(57) ABSTRACT

A battery module is disclosed. In one aspect, the battery module includes: a plurality of rechargeable batteries electrically connected to each other, wherein each of the rechargeable batteries comprises a first short-circuit generator configured to be short-circuited based on an increase in battery internal pressure. The battery module also includes a positive electrode and a negative electrode respectively connected to first and second ones of the rechargeable batteries and a first drawn-out tab and a second drawn-out tab respectively connected to the positive and negative electrodes. The battery module further includes a switch configured to electrically connect the negative electrode and the second drawn-out tab and a second short-circuit generator electrically connected to the switch, wherein the second short-circuit generator overlaps, in the height dimension of each of the rechargeable batteries, the first short-circuit generator of the second rechargeable battery.

18 Claims, 6 Drawing Sheets

(51) Int. Cl.
  *H01M 2/12* (2006.01)
  *H01M 2/10* (2006.01)
  *H01M 2/20* (2006.01)
  *H01M 10/052* (2010.01)

(52) U.S. Cl.
  CPC ............ *H01M 2/202* (2013.01); *H01M 2/34* (2013.01); *H01M 10/425* (2013.01); *H01M 10/052* (2013.01); *H01M 2200/00* (2013.01); *H01M 2200/20* (2013.01)

(58) Field of Classification Search
  CPC ........... H01M 2/1235; H01M 2200/00; H01M 10/052; H01M 2200/20
  See application file for complete search history.

(56) References Cited

U.S. PATENT DOCUMENTS

| | | | | |
|---|---|---|---|---|
| 2012/0237802 A1* | 9/2012 | Byun | .................... | H01M 2/043 429/53 |
| 2013/0252038 A1* | 9/2013 | Kim | .................... | H01M 2/1077 429/61 |
| 2013/0280560 A1* | 10/2013 | Lim | ........................ | H01M 2/34 429/49 |

\* cited by examiner

BATTERY MODULE

RELATED APPLICATIONS

This application claims priority to and the benefit of Korean Patent Application No. 10-2015-0078604 filed in the Korean Intellectual Property Office on Jun. 3, 2015, the entire contents of which are incorporated herein by reference.

BACKGROUND

Field

The described technology generally relates to a battery module.

Description of the Related Technology

A secondary or rechargeable battery can be repeatedly charged and discharged, unlike a primary battery. Low-capacity rechargeable batteries may be used for portable compact electronic apparatuses, for example, mobile phones, notebook computers, tablet computers, and/or camcorders. High-capacity rechargeable batteries are typically used as a power source for driving the motor found in hybrid and all electric vehicles.

A single-cell rechargeable battery can be used in small electronic devices whereas a battery pack or module including a multiple battery cells connected to each other can be used in a motor-driving power source. The rechargeable battery module is formed by connecting electrode terminals in series or in parallel through a bus bar.

The rechargeable batteries are electrically connected as described above so that when an abnormal event occurs, such as overcharging, penetration, or an external short-circuit is generated to one unit battery of the rechargeable batteries, an overcurrent flows to other battery cells, they can be damaged. Isolating the overcurrent from spreading to other cells is thus desired.

The above information disclosed in this Background section is only for enhancement of understanding of the background of the described technology and therefore it may contain information that does not form the prior art that is already known in this country to a person of ordinary skill in the art.

SUMMARY OF CERTAIN INVENTIVE ASPECTS

One inventive aspect relates to a battery module with improved safety at a time of overcharging.

Another aspect is a battery module that can prevent a plurality of rechargeable batteries connected to each other from being damaged.

Another aspect is a battery module with improved safety by intercepting a flow of a short-circuit current at a time of overcharging.

Another aspect is a battery module including: a module including a plurality of rechargeable batteries including a short-circuit member transformed by an increase of an internal pressure; a first drawn-out tab and a second drawn-out tab connected to a positive electrode and a negative electrode of the module; a switch for electrically connecting between the negative electrode of the module and the second drawn-out tab; and an auxiliary short-circuit member overlapping the short-circuit member of the rechargeable battery including a negative electrode connected to the second drawn-out tab inside the module, and electrically connected to the switch.

The battery module may further include an auxiliary terminal including a first terminal connected to the negative electrode of the module and a second terminal connected to the switch.

The rechargeable batteries may be connected in series.

The rechargeable batteries may be placed in series, and the negative electrode and the positive electrode of the module may be electrically connected to a positive electrode of a first rechargeable battery and a negative electrode of a second rechargeable battery provided at respective ends of the rechargeable batteries placed in series.

The first drawn-out tab may be electrically connected to the positive electrode of the first rechargeable battery, and the second drawn-out tab may be electrically connected to the negative electrode of the second rechargeable battery.

The switch may intercept a flow of current when the current is greater than a predetermined value.

The switch may be a pyro switch.

The rechargeable battery may include an electrode assembly including a positive electrode and a negative electrode and performing charging and discharging, a case in which the electrode assembly is provided, and a cap plate combined to the case, and the short-circuit member and the cap plate may be electrically connected to the positive electrode.

The short-circuit member may be curved to form a convex arc toward the electrode assembly.

The cap plate may include a short-circuit hole penetrating through the cap plate, and the short-circuit member further may include an edge fixed to the cap plate inside the short-circuit hole.

The auxiliary short-circuit member further may include a protrusion protruded toward the short-circuit hole.

The protrusion may be circular with respect to a plane.

The cap plate may be formed of a plate having a length direction and a width direction, and the short-circuit member may be provided between a first electrode connected to the positive electrode and a second electrode connected to the negative electrode.

Another aspect is a battery module comprising: a plurality of rechargeable batteries electrically connected to each other, wherein each of the rechargeable batteries comprises a first short-circuit generator configured to be short-circuited based on an increase in battery internal pressure; a positive electrode and a negative electrode respectively connected to first and second ones of the rechargeable batteries; a first drawn-out tab and a second drawn-out tab respectively connected to the positive and negative electrodes; a switch configured to electrically connect the negative electrode and the second drawn-out tab; and a second short-circuit generator electrically connected to the switch, wherein the second short-circuit generator overlaps, in the height dimension of each of the rechargeable batteries, the first short-circuit generator of the second rechargeable battery.

The above battery module further comprises: an auxiliary terminal including a first terminal connected to the negative electrode and a second terminal connected to the switch. In the above battery module, the rechargeable batteries are connected in series. In the above battery module, the first and second rechargeable batteries are placed on opposing ends of the battery module. In the above battery module, the first drawn-out tab is electrically connected to the positive electrode of the first rechargeable battery, and wherein the second drawn-out tab is electrically connected to the negative electrode of the second rechargeable battery. In the above battery module, the switch is configured to intercept a flow of current when the current is greater than a predetermined value. In the above battery module, the switch is a pyro switch.

In the above battery module, the rechargeable battery includes an electrode assembly including a positive electrode and a negative electrode and configured to perform charging and discharging, a case accommodating the electrode assembly, and a cap plate combined to the case, and wherein the first short-circuit generator and the cap plate are electrically connected to the positive electrode of the electrode assembly. In the above battery module, the first short-circuit generator is curved to form a convex arc toward the electrode assembly.

In the above battery module, the cap plate includes a short-circuit hole penetrating through the cap plate, and wherein the first short-circuit generator further includes an edge fixed to the cap plate inside the short-circuit hole. In the above battery module, the second short-circuit generator further includes a protrusion extending toward the short-circuit hole. In the above battery module, the protrusion is circular with respect to a plane. In the above battery module, the cap plate is formed of a plate having a length direction and a width direction, and wherein the first short-circuit generator is provided between first and second electrodes respectively connected to the positive and negative electrodes of the electrode assembly.

Another aspect is a battery module comprising: a plurality of rechargeable batteries electrically connected to each other, wherein each of the rechargeable batteries comprises a first short-circuit generator configured to be short-circuited based on an increase in battery internal pressure; a positive electrode and a negative electrode respectively connected to first and second selected ones of the rechargeable batteries; a first drawn-out tab and a second drawn-out tab respectively connected to the positive and negative electrodes; a switch configured to electrically connect between the negative electrode and the second drawn-out tab; and a second short-circuit generator electrically connected to the switch, wherein the second short-circuit generator is placed over the first short-circuit generator of at least one of the first and second selected rechargeable batteries.

In the above battery module, the first and second selected rechargeable batteries are placed on outermost and opposing ends of the battery module. In the above battery module, the second short-circuit generator is formed on only one of the first and second selected rechargeable batteries. In the above battery module, the second short-circuit generator is larger in size than the first short-circuit generator. In the above battery module, the second short-circuit generator fully covers the first short-circuit generator. In the above battery module, the first short-circuit generator is non-linear, and wherein the second short-circuit generator is substantially linear. In the above battery module, the first short-circuit generator is curved to form a convex arc toward the electrode assembly, and wherein the second short-circuit generator has a plate shape.

At least one of the disclosed embodiments can minimize damage to the battery module and provide a battery module with improved stability by using a fuse member and intercepting the flow of a short-circuit current.

DETAILED DESCRIPTION OF CERTAIN INVENTIVE EMBODIMENTS

Figure 1:
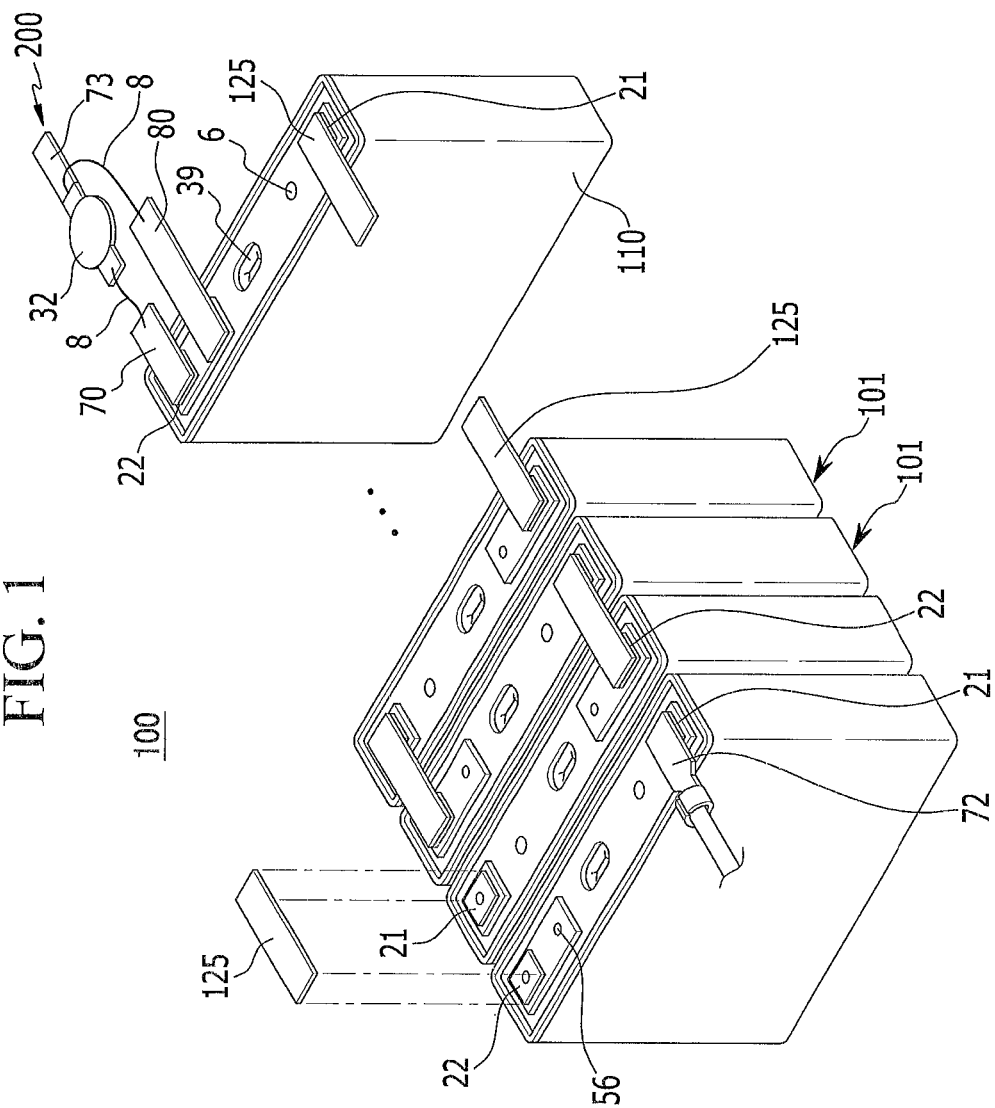
FIG. 1 shows a perspective view of a battery module according to an exemplary embodiment.

Embodiments will be described more fully hereinafter with reference to the accompanying drawings. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification. In this disclosure, the term "substantially" includes the meanings of completely, almost completely or to any significant degree under some applications and in accordance with those skilled in the art. The term "connected" can include an electrical connection.

FIG. 1 shows a perspective view of a battery module 100 according to an exemplary embodiment.

Referring to FIG. 1, the battery module 100 includes a plurality of rechargeable batteries 101 that are sequentially placed. The battery module 100 includes a positive electrode and a negative electrode, and the positive electrode and the negative electrode of the battery module 100 may be electrode terminals of a rechargeable battery provided to an outermost part from among a plurality of rechargeable batteries configuring the battery module 100.

The rechargeable batteries 101 are electrically connected in series to each other, and may be placed in a line. The rechargeable batteries 101 can be electrically connected in series to each other by a connecting member 125. The connecting member 125 may be a long plate shaped conductor, and electrically connects a first terminal 21 and a second terminal 22 between the rechargeable batteries 101. In this case, the first and second terminals 21 and 22 may have different polarities. For example, the first terminal is a positive terminal and the second terminal is a negative terminal.

A first drawn-out tab 72 for outputting a current is installed in the first terminal 21 that is a positive terminal of the rechargeable batteries 101 placed on a first-side lateral end from among the rechargeable batteries 101 coupled in series. The battery module 100 can include a short-circuit member or a first short-circuit generator 56 and an auxiliary short-circuit member or a second short-circuit generator 80. The auxiliary short-circuit member 80 can be placed on the short-circuit member 56 of the rechargeable battery placed on a second-side lateral end from among the rechargeable batteries, and the auxiliary short-circuit member 80 is electrically connected to a second drawn-out tab 73 for outputting a current.

The auxiliary short-circuit member 80 may be a long plate to overlap the short-circuit member 56 in the height dimension of the battery 101. For example, the auxiliary short-circuit member 80 is placed directly above the short-circuit member 56. A first side of the auxiliary short-circuit member 80 may have a protrusion extending toward a short-circuit hole 3 (refer to FIG. 5) in which the short-circuit member 56 is installed. The protrusion may be circular with respect to the plane. When the protrusion is formed and the short-circuit member 56 is turned, the short-circuit member 56 is configured to contact the protrusion so a contact area may be increased compared to the case when the short-circuit member contacts the auxiliary short-circuit member 80.

The first and second drawn-out tabs 72 and 73 transmit a current to a device in which the battery module 100 is installed.

The first and second terminals of two rechargeable batteries electrically forming respective terminals of a battery from among a plurality of rechargeable batteries configuring the battery module are connected to the first and second drawn-out tabs 72 and 73 so they may be a positive electrode and a negative electrode of the battery module respectively.

The battery module 100 may further include a switch 200 connected to the battery module 100 so as to prevent an explosion caused by overcharging. Here, the switch 200 may be a pyro switch.

Figure 2:
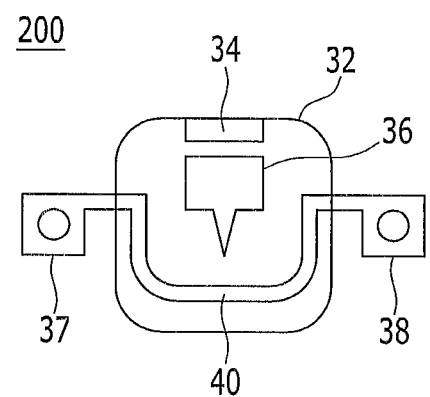
FIG. 2 and FIG. 3 show schematic diagrams of a pyro switch according to an exemplary embodiment.
Figure 3:
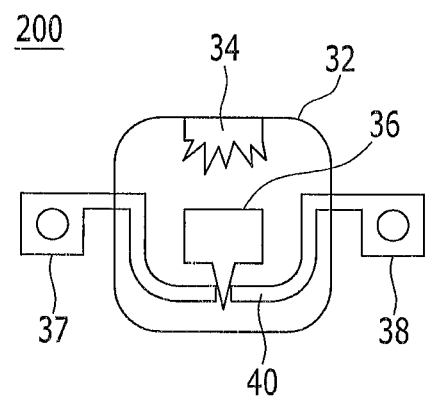

FIG. 2 and FIG. 3 show schematic diagrams of a pyro switch according to an exemplary embodiment Referring to FIG. 2, the switch 200 includes a housing 32 having an internal space, an explodable portion 34 installed in one side in the housing 32, a cable 40 passing through the inside of the housing 32, a cutting pin 36 provided between the cable 40 and the explodable portion 34, and electrodes 37 and 38 provided outside the housing 32 and electrically connected to respective ends of the cable 40.

The explodable portion 34 senses the current transmitted through the switch 200, and it may be exposed when a current that is greater than a predetermined value of current flows.

Referring to FIG. 3, when an abnormal current is sensed, the explodable portion 34 inside the switch 200 explodes and the cutting pin 36 moves to the cable 40 on a lower portion by an explosion pressure to cut the cable 40.

Therefore, the abnormal current does not flow but is intercepted by the cut cable 40.

Referring to FIG. 1, the respective electrodes of the switch 200 may be connected to the rechargeable battery connected to the second drawn-out tab 73 through an electric wire 8. For convenience of description, the rechargeable battery connected to the switch 200 will be referred to as a terminal battery 110.

The second terminal 22 of the terminal battery 110 is connected to an auxiliary terminal 70, and the short-circuit member 56 overlaps the auxiliary short-circuit member 80.

One electrode 37 of the switch 200 is connected to the auxiliary terminal 70 through the electric wire 8, and the other electrode 38 is electrically connected to the auxiliary short-circuit member 80. In this instance, the electrode 37 of the switch 200 may be electrically connected to the second terminal 22 of the terminal battery 110 without the auxiliary terminal 70.

As described above, when the switch 200 is connected to the terminal battery 110, the second drawn-out tab 73 may be electrically connected to the electrode 38 of the switch 200 connected to the auxiliary short-circuit member 80.

A rechargeable battery included in a battery module according to an exemplary embodiment will now be described with reference to drawings.

Figure 4:
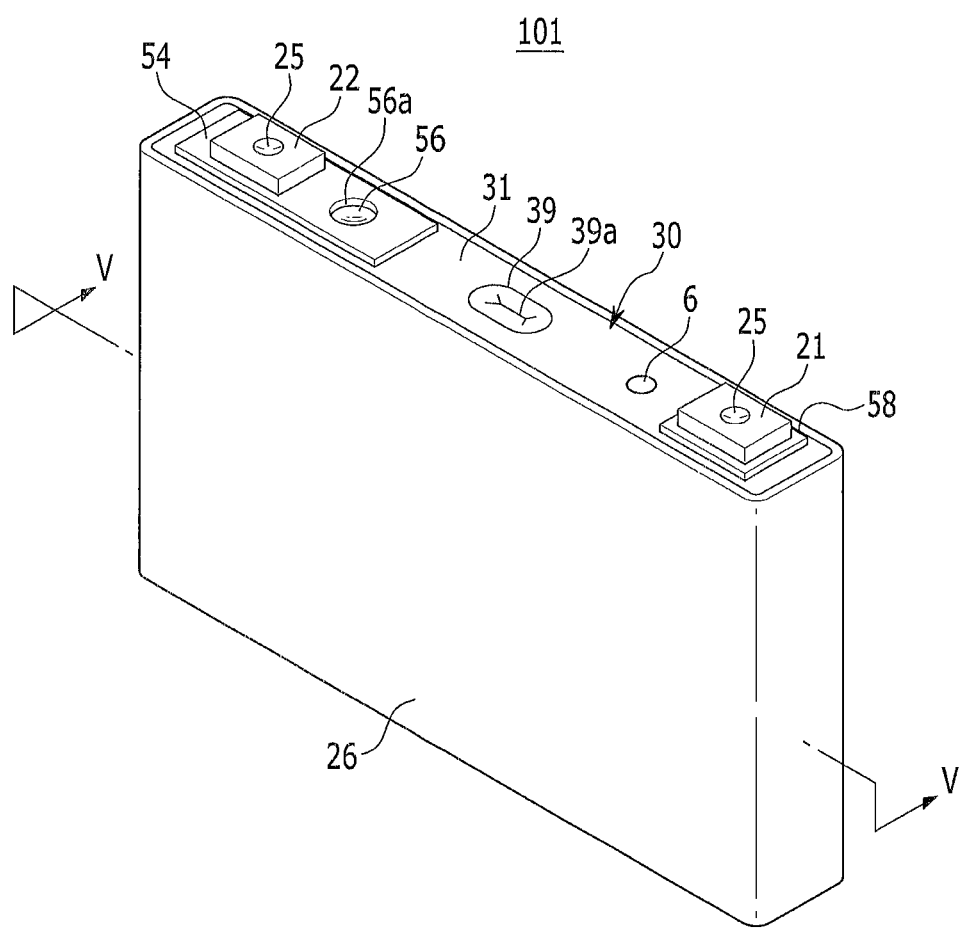
FIG. 4 shows a perspective view of a rechargeable battery in a rechargeable battery module shown in FIG. 1.
Figure 5:
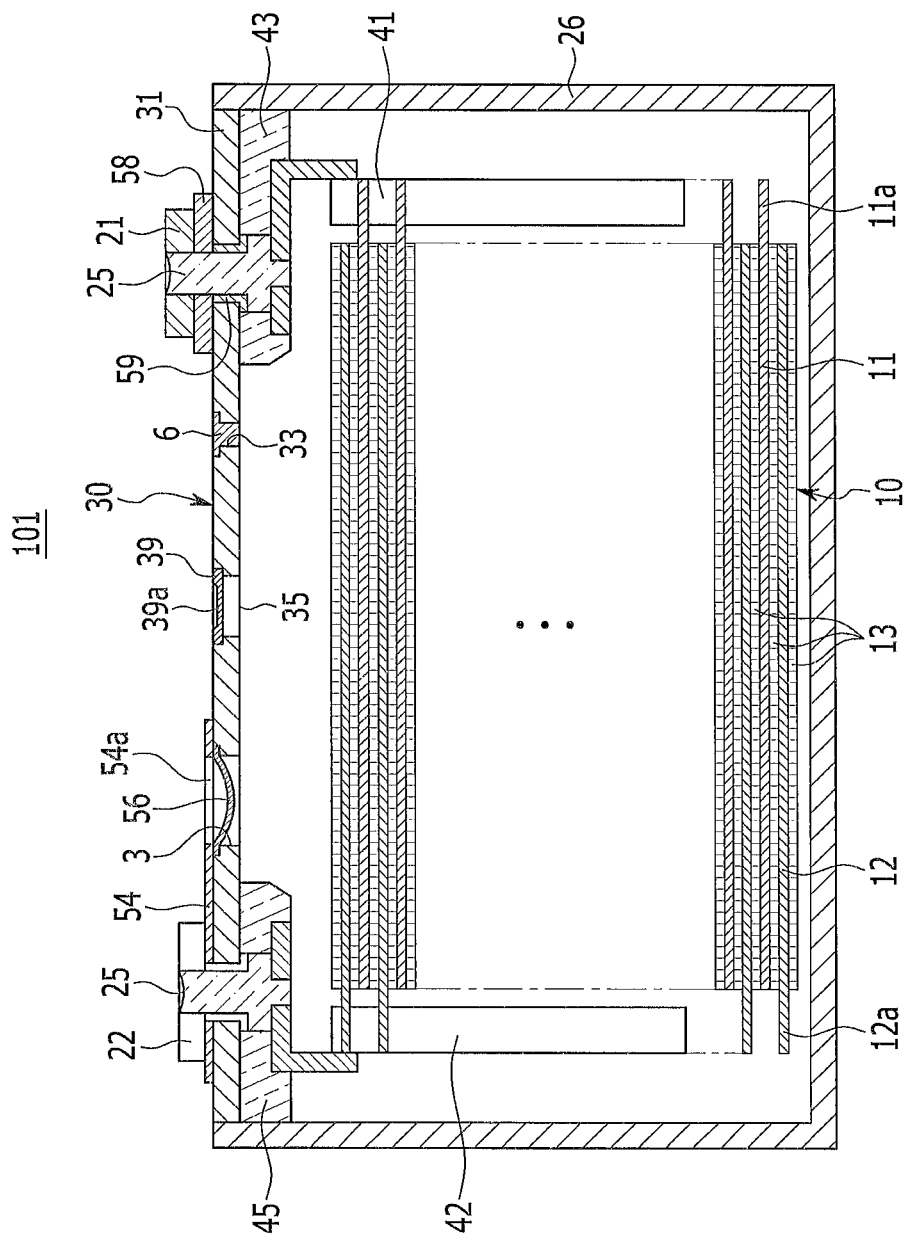
FIG. 5 shows a cross-sectional view with respect to a line V-V of FIG. 4.

FIG. 4 shows a perspective view of a rechargeable battery in a rechargeable battery module shown in FIG. 1, and FIG. 5 shows a cross-sectional view with respect to a line V-V of FIG. 4.

Referring to FIG. 4 and FIG. 5, the rechargeable battery 101 according to an exemplary embodiment includes an electrode assembly 10 spirally wound with a separator 13 between a positive electrode (first electrode) 11 and a negative electrode (second electrode) 12, a case 26 in which an electrode assembly 10 is provided, and a cap assembly 30 combined into an opening of the case 26.

The rechargeable battery 101 will be exemplarily described as a lithium ion secondary battery with a square shape. The present invention is not limited thereto, and may be applied to various types of batteries such as a lithium polymer battery or a cylindrical battery.

Each of the positive and negative electrodes 11 and 12 includes a coated region where an active material is coated on a current collector formed of a thin-plate metal foil, and uncoated regions 11a and 12a where the active material is not coated. The positive uncoated region 11a is formed on one lateral end of the positive electrode 11 in a length direction of the positive electrode 11. The negative uncoated region 12a is formed on another lateral end of the negative electrode 12 in a length direction of the negative electrode 12. The positive and negative electrodes 11 and 12 are spirally wound with the separator 13 that is an insulator provided therebetween.

The present invention is not limited thereto, and the electrode assembly 10 may be configured with a positive electrode and a negative electrode that are formed with a plurality of sheets and are stacked with a separator therebetween.

The case 26 can be substantially cuboidal and can include an opening on one side. The case 26 may be made of a metal such as aluminum or stainless steel.

The cap assembly 30 includes a cap plate 31 for covering the opening of the case 26, the first terminal 21 protruded outside the cap plate 31 and electrically connected to the positive electrode 11, and the second terminal 22 protruded outside the cap plate 31 and electrically connected to the negative electrode 12.

The cap plate 31 can be formed of a long plate extending in one direction and is combined to the opening of the case 26. A sealing stopper 6 is installed in an electrolyte injection opening 33 formed in the cap plate 31, and a vent plate 39 in which a notch 39a is formed is installed in a vent hole 35 formed in the cap plate 31 so that it may be opened at a predetermined pressure. The first and second terminals 21 and 22 are installed to be protruded to an upper portion of the cap plate 31.

The first terminal 21 is electrically connected to the positive electrode 11 with a first current collecting member 41 as a medium, and the second terminal 22 is electrically connected to the negative electrode 12 with a second current collecting member 42 as a medium. The present invention is not limited thereto, and the first terminal 21 may be electrically connected to the negative electrode, while the second terminal 22 may be electrically connected to the positive electrode.

The first terminal 21 can be a rectangular plate. The first terminal 21 is electrically connected to the positive electrode 11 with a connecting terminal 25 bonded to the first current collecting member 41 as a medium. The connecting terminal 25 combined to the first terminal 21 and the connecting terminal 25 combined to the second terminal 22 have the same configuration.

A sealing gasket 59 is inserted into a hole through which a terminal passes between the first terminal 21 and the cap plate 31, and a lower insulating member 43 for supporting the first current collecting member 41 is installed below the cap plate 31.

A cap connecting member 58 for electrically connecting the first terminal 21 and the cap plate 31 is installed on a lower portion of the first terminal 21. Therefore, the cap plate 31 and the case 26 are positively charged.

The second terminal 22 can be a rectangular plate. The second terminal 22 is electrically connected to the negative electrode 12 with the connecting terminal 25 bonded to the second current collecting member 42 as a medium. The connecting terminal 25 passes through the cap plate 31 and the second terminal 22 and its upper portion is fixed to the second terminal 22.

The sealing gasket 59 is inserted into a hole through which a terminal passes between the second terminal 22 and the cap plate 31. The lower insulating member 43 for insulating the second terminal 22 and the second current collecting member 42 from the cap plate 31 is installed below the cap plate 31. An upper insulating member 54 is installed between the second terminal 22 and the cap plate 31. The upper insulating member 54 is formed to extend to the short-circuit hole 3, and an opening 54a provided to an upper portion of a short-circuit hole 3 and connected to the short-circuit hole 3 is formed in the upper insulating member 54.

The cap assembly 30 includes the short-circuit member 56 for short-circuiting the positive and negative electrodes 11 and 12. The short-circuit member 56 is electrically connected to the cap plate 31 and is transformed to generate a short-circuit when an internal pressure of the rechargeable battery 101 increases.

The short-circuit hole 3 is formed in the cap plate 31, and the short-circuit member 56 is placed between the upper insulating member 54 and the cap plate 31 in the short-circuit hole 3. The short-circuit member 56 can be non-linear. For example, the short-circuit member 56 includes a curve that is curved downward to be convex as an arc, and an edge formed outside the curve and fixed to the cap plate 31. The short-circuit member 56 is provided on a lower portion of the opening.

The short-circuit member 56 is provided between the second terminal 22 and the vent hole 35, and is placed close to the second terminal 22.

As shown in FIG. 1 and FIG. 2, the auxiliary short-circuit member 80 is placed on the short-circuit member 56 of the terminal battery from among a plurality of rechargeable batteries that are electrically connected to each other in series. The upper insulating member 54 insulates the auxiliary short-circuit member 80 and the case.

As described above, when a switch is connected to the terminal battery of the battery module, the damage to the overcharged rechargeable battery caused by an abnormal reaction may be prevented, which will now be described in detail with reference to FIG. 6 and FIG. 7.

Figure 6:
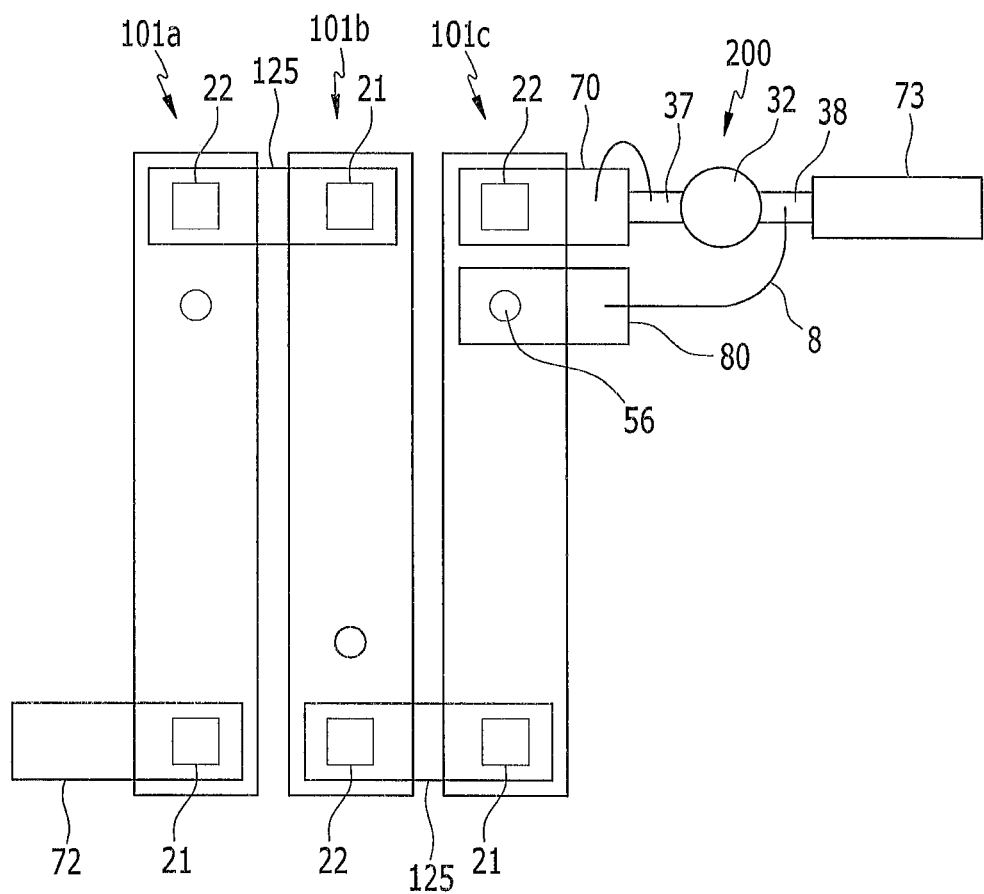
FIG. 6 and FIG. 7 show top plan views for an operation of a switch included in a rechargeable battery module according to an exemplary embodiment.
Figure 7:
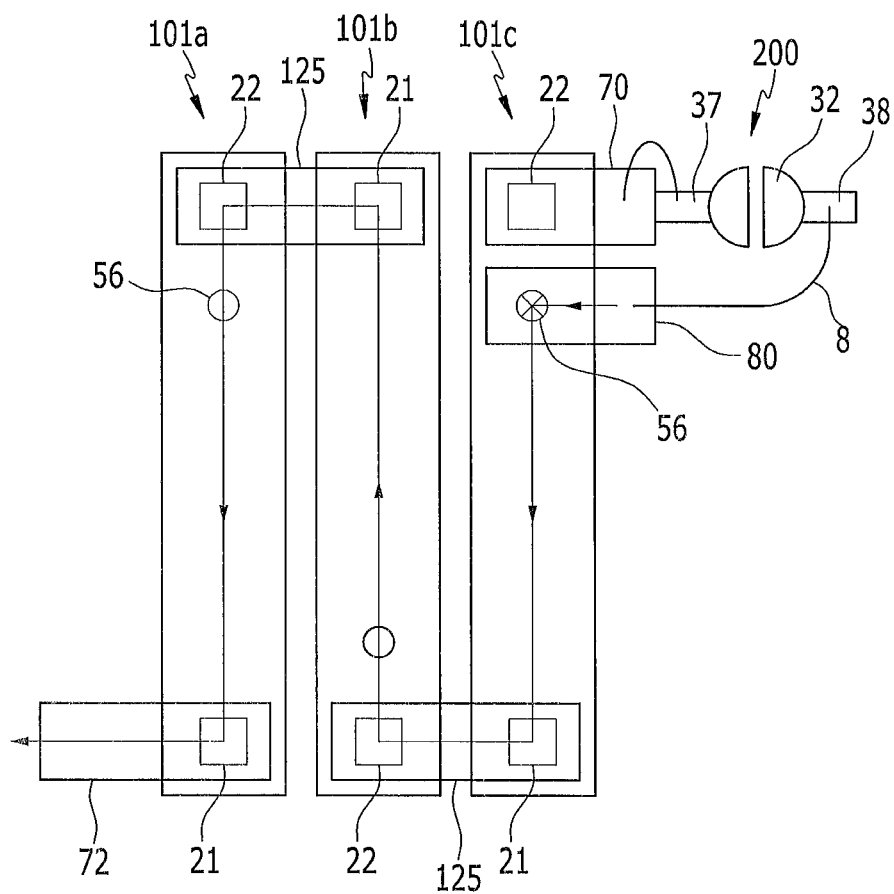

FIG. 6 and FIG. 7 show top plan views for an operation of a switch included in a rechargeable battery module according to an exemplary embodiment.

FIG. 6 and FIG. 7 exemplify three rechargeable batteries connected in series. FIG. 6 shows a top plan view of a rechargeable battery module before an abnormal reaction is generated, and FIG. 7 shows a top plan view of a rechargeable battery module after an abnormal reaction is generated.

As shown in FIG. 6, a first terminal 21 and a second terminal 22 of the three rechargeable batteries 101a-101c are connected in series by a connecting member 125. To sequentially connect the first terminal and the second terminal to the connecting member 125, the rechargeable battery may be placed so that the first and second terminals 21 and 22 may be alternately provided.

For convenience of description, a first rechargeable battery 101a, a second rechargeable battery 101b, and a third rechargeable battery 101c will be called in an order of becoming distant from the rechargeable battery provided near the first drawn-out tab 72. The third rechargeable battery indicates the terminal battery 110 of FIG. 1.

The switch 200 includes one terminal 37 electrically connected to an auxiliary terminal 70 connected to the second terminal 22 of the third rechargeable battery 101c through the electric wire 8, and another terminal 38 electrically connected to an auxiliary short-circuit member 80 overlapping the short-circuit member 56 of the third rechargeable battery 101c through the electric wire 8.

The first terminal 21 of the first rechargeable battery 101a is connected to the first drawn-out tab 72, and the terminal 38 of the switch 200 connected to the auxiliary short-circuit member 80 is connected to the second drawn-out tab 73.

An abnormal reaction may occur in the rechargeable battery because of various factors inside or outside the rechargeable battery module shown in FIG. 6, The case in which the third rechargeable battery 101c generates an abnormal reaction will now be exemplified.

When an abnormal reaction is generated in the rechargeable battery, gas is generated and an internal pressure of the rechargeable battery is increased. When the internal pressure of the rechargeable battery becomes greater than a predetermined pressure, the curve of the short-circuit member 56 becomes convex in the opposite direction to contact a lower side of the auxiliary short-circuit member 80 and generate a short-circuit.

As shown in FIG. 6, when the third rechargeable battery 101c generates an abnormal reaction, the short-circuit member 56 of the third rechargeable battery 101c can be reversed to contact the lower side of the auxiliary short-circuit member 80 and become short-circuited.

The short-circuit member 56 can be fixed to a side wall in a short-circuit hole 3 formed in the case 26 and is connected to a positive electrode by the case 26 contacting the first terminal 21 that is a positive electrode. The auxiliary short-circuit member 80 is connected to the negative electrode through the auxiliary terminal 70 connected to the second terminal 22 that is a negative electrode and the switch 200.

Therefore, when the short-circuit member 56 of the third rechargeable battery 101c is inverted and transformed to contact the auxiliary short-circuit member 80 at an upper portion, the short-circuit member 56 that is a positive electrode contacts the auxiliary short-circuit member 80 that is a negative electrode. Therefore, a short-circuit current that is, for example, several tens of times of the usual rate flows, and the short-circuit current is transmitted to the switch 200 through the auxiliary short-circuit member 80.

The switch 200 can be exploded when more than a predetermined current is provided. For example, the switch 200 is exploded when a high current such as a short-circuit current is applied, thereby intercepting the flow of current. When the short-circuit current is blocked by the switch 200, the second drawn-out tab 73 is connected to the second terminal 22 of the second rechargeable battery 101b through the auxiliary short-circuit member 80 and the connecting member 125 connected to the first terminal 21 of the third rechargeable battery 101c.

Therefore, the current may be generated by using the first and second rechargeable batteries 101a and 101b excluding the third rechargeable battery 101c that is a terminal battery short-circuited by the abnormal reaction.

When the switch is installed in the rechargeable battery provided to one of the respective ends that are electrically connected in the battery module in a like manner of an exemplary embodiment, the flow of the short-circuit current may be easily intercepted by using the switch when an abnormal reaction is generated to the rechargeable battery connected to the switch.

Further, the second terminal and the second drawn-out tab of the rechargeable battery to which the abnormal reaction is generated and the neighboring rechargeable battery are electrically connected to each other so the current may be generated by the rechargeable batteries excluding the rechargeable battery to which the abnormal reaction is generated.

While the inventive technology has been described in connection with exemplary embodiments, it is to be understood that the invention is not limited to the disclosed embodiments, but, on the contrary, is intended to cover various modifications and equivalent arrangements included within the spirit and scope of the appended claims.

What is claimed is:

1. A battery module comprising:
a plurality of rechargeable batteries electrically connected to each other, wherein each of the rechargeable batteries comprises a first short-circuit generator configured to be short-circuited based on an increase in battery internal pressure;
a positive electrode and a negative electrode respectively connected to first and second ones of the rechargeable batteries;
a first drawn-out tab and a second drawn-out tab respectively connected to the positive and negative electrodes;
a switch configured to electrically connect the negative electrode and the second drawn-out tab;
a second short-circuit generator electrically connected to the switch, wherein the second short-circuit generator overlaps, in a height dimension of each of the rechargeable batteries, the first short-circuit generator of the second rechargeable battery; and
an auxiliary terminal including a first terminal connected to the negative electrode and a second terminal connected to the switch,
wherein the switch includes a first electrode and a second electrode opposing each other, wherein the first electrode is connected to the auxiliary terminal, wherein the second electrode is connected to the second drawn-out tab and the second short-circuit generator, and
wherein, in response to a short-circuit of a selected one of the rechargeable batteries, the switch is configured to intercept a flow of battery current in the selected rechargeable battery, and to feed the battery current through remaining rechargeable batteries via the second electrode of the switch and the second drawn-out tab.

2. The battery module of claim 1, wherein the rechargeable batteries are connected in series.

3. The battery module of claim 1, wherein the first and second rechargeable batteries are placed on opposing ends of the battery module.

4. The battery module of claim 3, wherein the first drawn-out tab is electrically connected to the positive electrode of the first rechargeable battery, and wherein the second drawn-out tab is electrically connected to the negative electrode of the second rechargeable battery.

5. The battery module of claim 3, wherein the switch is a pyro switch.

6. The battery module of claim 1, wherein the rechargeable battery includes an electrode assembly including a positive electrode of the electrode assembly and a negative electrode of the electrode assembly and configured to perform charging and discharging, a case accommodating the electrode assembly, and a cap plate combined to the case, and wherein the first short-circuit generator and the cap plate are electrically connected to the positive electrode of the electrode assembly.

7. The battery module of claim 6, wherein the first short-circuit generator is curved to form a convex arc toward the electrode assembly.

8. The battery module of claim 7, wherein the cap plate includes a short-circuit hole penetrating through the cap plate, and wherein the first short-circuit generator further includes an edge fixed to the cap plate inside the short-circuit hole.

9. The battery module of claim 8, wherein the second short-circuit generator further includes a protrusion extending toward the short-circuit hole.

10. The battery module of claim 9, wherein the protrusion is circular with respect to a plane.

11. The battery module of claim 6, wherein the cap plate is formed of a plate having a length direction and a width direction, and wherein the first short-circuit generator is provided between first and second electrodes respectively connected to the positive and negative electrodes of the electrode assembly.

12. A battery module comprising:
a plurality of rechargeable batteries electrically connected to each other, wherein each of the rechargeable batteries comprises a first short-circuit generator configured to be short-circuited based on an increase in battery internal pressure;
a positive electrode and a negative electrode respectively connected to first and second selected ones of the rechargeable batteries;
a first drawn-out tab and a second drawn-out tab respectively connected to the positive and negative electrodes;
a switch configured to electrically connect between the negative electrode and the second drawn-out tab;
a second short-circuit generator electrically connected to the switch, wherein the second short-circuit generator is placed over the first short-circuit generator of at least one of the first and second selected rechargeable batteries; and
an auxiliary terminal including a first terminal connected to the negative electrode and a second terminal connected to the switch,
wherein the switch includes a first electrode and a second electrode opposing each other, wherein the first electrode is connected to the auxiliary terminal, wherein the second electrode is connected to the second drawn-out tab and the second short-circuit generator, and
wherein, in response to a short-circuit of a selected one of the rechargeable batteries, the switch is configured to intercept a flow of battery current in the selected rechargeable battery, and to feed the battery current through remaining rechargeable batteries via the second electrode of the switch and the second drawn-out tab.

13. The battery module of claim 12, wherein the first and second selected rechargeable batteries are placed on outermost and opposing ends of the battery module.

14. The battery module of claim 13, wherein the second short-circuit generator is formed on only one of the first and second selected rechargeable batteries.

15. The battery module of claim 12, wherein the second short-circuit generator is larger in size than the first short-circuit generator.

16. The battery module of claim 12, wherein the second short-circuit generator fully covers the first short-circuit generator.

17. The battery module of claim 12, wherein the first short-circuit generator is non-linear, and wherein the second short-circuit generator is substantially linear.

18. The battery module of claim 17, wherein the first short-circuit generator is curved to form a convex arc toward the electrode assembly, and wherein the second short-circuit generator has a plate shape.

* * * * *